United States Patent
Krapf et al.

(10) Patent No.: US 9,715,011 B2
(45) Date of Patent: Jul. 25, 2017

(54) LOCATING DEVICE

(75) Inventors: Reiner Krapf, Filderstadt (DE); Chistoph Wieland, Stuttgart-Vaihingen (DE); Ulli Hoffman, Niefern-Oeschelbronn (DE)

(73) Assignee: Robert Bosch GmbH, Stuttgart (DE)

( * ) Notice: Subject to any disclaimer, the term of this patent is extended or adjusted under 35 U.S.C. 154(b) by 702 days.

(21) Appl. No.: 13/133,849

(22) PCT Filed: Dec. 7, 2009

(86) PCT No.: PCT/EP2009/066475
§ 371 (c)(1),
(2), (4) Date: Aug. 29, 2011

(87) PCT Pub. No.: WO2010/066657
PCT Pub. Date: Jun. 17, 2010

(65) Prior Publication Data
US 2011/0298586 A1    Dec. 8, 2011

(30) Foreign Application Priority Data

Dec. 10, 2008   (DE) .......................... 10 2008 054 448

(51) Int. Cl.
*G08B 5/22* (2006.01)
*G01S 13/88* (2006.01)
*G01V 3/15* (2006.01)

(52) U.S. Cl.
CPC .............. *G01S 13/887* (2013.01); *G01V 3/15* (2013.01)

(58) Field of Classification Search
CPC ...... G01S 13/885; G01S 13/89; G01S 13/887; G01V 3/12; G01V 3/15; G01V 3/17
See application file for complete search history.

(56) References Cited

U.S. PATENT DOCUMENTS

| | | | |
|---|---|---|---|
| 5,289,163 A * | 2/1994 | Perez et al. | 340/539.32 |
| 5,296,807 A * | 3/1994 | Kousek et al. | 324/235 |
| 6,373,244 B1 * | 4/2002 | Nipp | 324/235 |
| 7,009,399 B2 * | 3/2006 | Olsson et al. | 324/326 |
| 7,190,302 B2 * | 3/2007 | Biggs | 342/22 |
| 7,316,073 B2 * | 1/2008 | Murray | 33/286 |
| 7,355,410 B2 * | 4/2008 | Schmitzer et al. | 324/326 |

(Continued)

FOREIGN PATENT DOCUMENTS

| | | |
|---|---|---|
| CN | 1063940 A | 8/1992 |
| DE | 41 03 216 A1 | 8/1992 |

(Continued)

OTHER PUBLICATIONS

International Search Report corresponding to PCT Application No. PCT/EP2009/066475, mailed Feb. 5, 2010 (German and English language document) (5 pages).

*Primary Examiner* — Quan-Zhen Wang
*Assistant Examiner* — Rajsheed Black-Childress
(74) *Attorney, Agent, or Firm* — Maginot, Moore & Beck LLP

(57) ABSTRACT

A locating device, particularly a handheld locating device, includes a housing, a display unit, and a locating unit, which is provided in order to detect a presence of an item arranged in an examination object by means of a measurement signal and which comprises an arithmetic unit. The arithmetic unit determines an orientation of an item image relative to a reference variable.

11 Claims, 6 Drawing Sheets

(56) References Cited

U.S. PATENT DOCUMENTS

| | | | |
|---|---|---|---|
| 7,414,235 B2* | 8/2008 | Hoffmann et al. | 250/221 |
| 7,626,400 B2* | 12/2009 | Holbrook et al. | 324/642 |
| 7,679,546 B2* | 3/2010 | Bublitz et al. | 342/22 |
| 7,956,794 B2* | 6/2011 | Skultety-Betz et al. | 342/22 |
| 8,111,169 B2* | 2/2012 | Krapf et al. | 340/686.6 |
| 8,253,619 B2* | 8/2012 | Holbrook et al. | 342/22 |
| 2004/0107017 A1* | 6/2004 | Hoffmann et al. | 700/98 |
| 2004/0155810 A1* | 8/2004 | Witten | 342/22 |
| 2005/0078303 A1* | 4/2005 | Murray | 356/138 |
| 2005/0151662 A1* | 7/2005 | Kashuba et al. | 340/690 |
| 2006/0178849 A1 | 8/2006 | Maier et al. | |
| 2007/0175054 A1* | 8/2007 | Murray | 33/286 |
| 2007/0194925 A1* | 8/2007 | Karr | 340/572.1 |
| 2007/0200547 A1* | 8/2007 | Chen | 324/67 |
| 2007/0296955 A1* | 12/2007 | Skultety-Betz et al. | 356/51 |
| 2008/0036644 A1* | 2/2008 | Skultety-Betz et al. | 342/22 |
| 2008/0111732 A1* | 5/2008 | Bublitz et al. | 342/179 |
| 2010/0117885 A1* | 5/2010 | Holbrook et al. | 342/22 |
| 2010/0219965 A1* | 9/2010 | Krapf et al. | 340/686.1 |
| 2011/0243476 A1* | 10/2011 | Sieracki | 382/291 |

FOREIGN PATENT DOCUMENTS

| | | |
|---|---|---|
| DE | 10 2006 000 364 A1 | 1/2008 |
| WO | 2007141062 A1 | 12/2007 |

\* cited by examiner

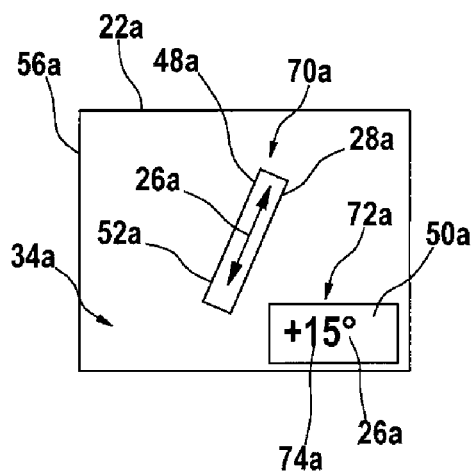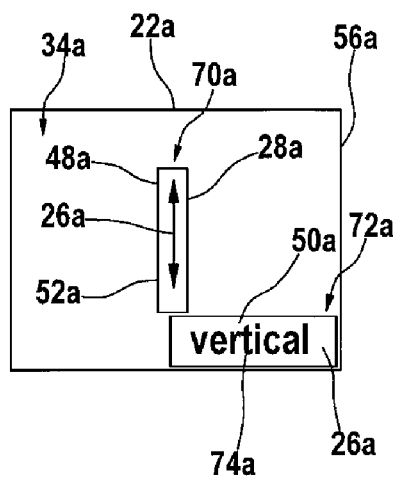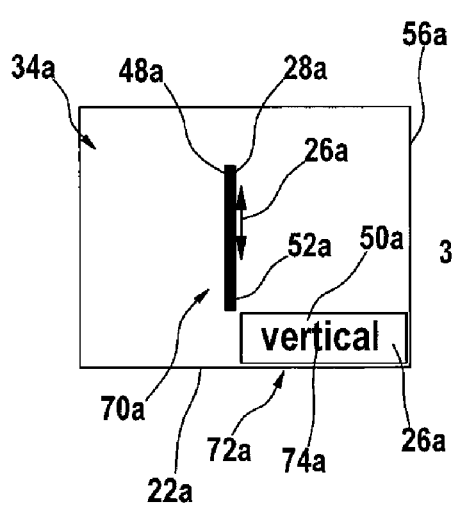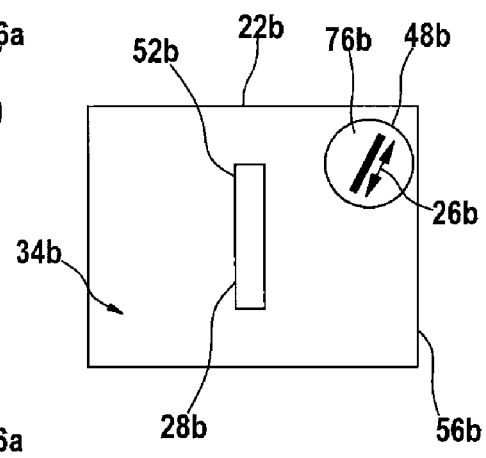

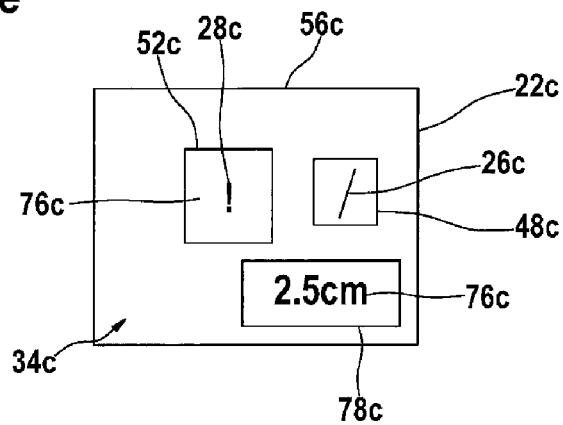
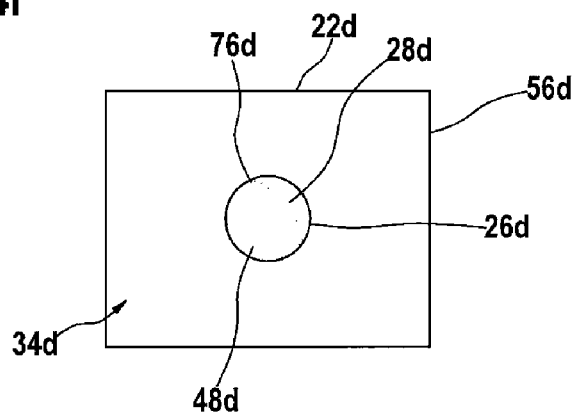
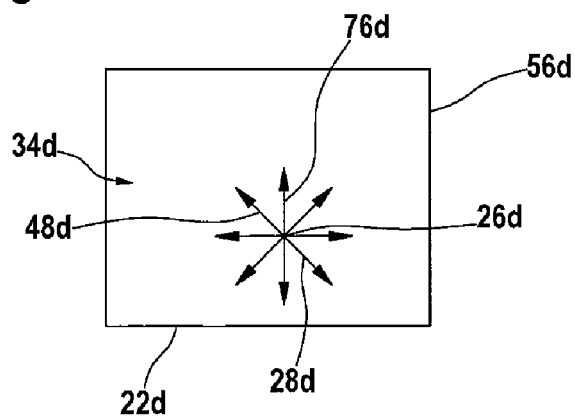

LOCATING DEVICE

This application is a 35 U.S.C. §371 National Stage Application of PCT/EP2009/066475, filed Dec. 7, 2009, which claims the benefit of priority to Serial No. 10 2008 054 448.5, filed Dec. 10, 2008 in Germany, the disclosures of which are incorporated herein by reference in their entirety.

BACKGROUND

The disclosure is based on a locating device as described herein.

A locating device, in particular a handheld locating device, having a housing and a locating unit, is intended to detect the presence of an item arranged in an examination object using a measurement signal and has a computation unit. The locating device also has a display unit.

SUMMARY

The disclosure is based on a locating device, in particular a handheld locating device, having a housing, a display unit and a locating unit which is intended to detect the presence of an item arranged in an examination object using a measurement signal and has a computation unit.

The disclosure proposes that the computation unit is intended to determine an orientation of an item image with respect to a reference variable. In this context, "intended" should be understood as meaning, in particular, specially equipped and/or specially designed and/or specially programmed and/or specially configured. Furthermore, an "item image" should be understood as meaning, in particular, an image captured in the locating unit and/or a captured projection of the item, which item image is preferably formed by a projection of a three-dimensional structure and/or of a three-dimensional profile of the item onto a two-dimensional surface, the image being able to be formed by a realistic reproduction of the item and/or a schematic reproduction of the item, for example a drawing and/or a sketch of the item, and/or a reproduction of the item by means of symbols. In principle, however, a projection of the three-dimensional structure and/or of the three-dimensional profile of the item to form a one-dimensional image is conceivable. An "orientation of the item image" should also be understood as meaning a direction along an orientation and/or a longitudinal extent of the item image, the orientation and/or the longitudinal extent preferably being oriented along a length of the item image. The orientation is preferably detected with respect to a reference variable formed by an axis, the axis being able to be formed by a housing axis and/or an axis parallel to gravitational acceleration and/or other axes which appear to be useful to a person skilled in the art. In this case, a "computation unit" should be understood as meaning, in particular, a unit which may be formed by an evaluation unit and/or a signal processing unit, the computation unit being able to be formed both by a processor alone and, in particular, by a processor and further electronic components, for example a memory means. The locating unit preferably comprises a sensor unit for emitting and/or receiving the measurement signal, the sensor unit being able to be formed from all sensor units which are known to a person skilled in the art, for example an inductive and/or a capacitive sensor unit and/or a radio-frequency sensor unit and/or a radar sensor unit and/or a UWB sensor unit and/or a terahertz sensor unit etc. The refinement according to the disclosure advantageously makes it possible to acquire a detailed item of information relating to the location of the item in the examination object, in particular a profile of the item in the examination object, and to transmit said information to the operator, in particular, and, in association therewith, to achieve a high degree of ease of use during operation of the locating device.

The disclosure also proposes that the reference variable is formed by a housing characteristic variable, thus advantageously making it possible to determine an orientation of the item with respect to the housing of the locating device. In this context, a "housing characteristic variable" should be understood as meaning, in particular, a characteristic variable formed by an axis, in particular a longitudinal axis, of the housing.

The disclosure also proposes that the computation unit is intended to determine an image of the examination object and/or of the item with assignment of the image to a dimension of the housing along at least one direction. In this context, an "image" should be understood as meaning, in particular, a realistic reproduction and/or a schematic reproduction of the examination object and/or of the item, for example a drawing and/or a sketch of the examination object and/or of the item, and/or a reproduction of the examination object and/or of the item by means of symbols. A "dimension of the housing along at least one direction" should be understood as meaning, in particular, a length along a longitudinal direction of the housing and/or a width of the housing along a widthwise direction. The image determined in this manner is preferably displayed for the operator by the display unit, thus making it possible for the operator to locate the item which has been located and/or detected in a particularly simple manner. In addition, the operator can assign and/or transfer the determined image to a surface of the examination object in a particularly simple manner.

In a particularly advantageous manner, the computation unit is intended to detect at least one reference characteristic variable of the housing with respect to the examination object. In this context, a "reference characteristic variable" should be understood as meaning, in particular, a characteristic variable and/or a parameter which defines a dimension corresponding to the dimension along the at least one direction of the housing with respect to the examination object. In this case, a region of the examination object which is detected by the locating unit can be advantageously displayed for an operator. In addition, the operator can easily assign the image displayed by the display unit to the examination object.

The disclosure also proposes that the locating unit has at least one inclination sensor which is intended to detect an orientation of the reference variable formed by gravitational acceleration. An advantageous absolute orientation of the item and/or of the item image can be achieved, an "absolute orientation" being understood as meaning, in particular, an orientation and/or alignment of the captured item image and/or of the item, in particular a longitudinal extent of the item image and/or of the item with respect to gravity acting on the locating device and/or on the item. In addition, an orientation and/or a profile of the item can be detected independently of a position and/or positioning of the locating device during measurement operation and it is thus possible to reconstruct the item in the examination object in a particularly simple manner.

One advantageous development of the disclosure proposes that the display unit has at least one display element which is intended to display the orientation of the item image with respect to the reference variable. In this case, a detailed map of a structure, in particular of an internal structure, of the examination object can be advantageously displayed for the operator. In this case, the orientation of the item image can be graphically displayed for the operator in a particularly advantageous manner and the operator can thus optically detect the orientation in a particularly rapid manner. The display element is preferably formed by an individual display segment and/or an individual display point, for example a pixel, in particular of a liquid crystal display, and/or by a luminous means, for example a light emitting diode. The display element may be formed by one or more display segments and/or by a position indicator symbol and/or by a written notice, for example horizontal, vertical, and/or an angle specification, etc.

Particularly advantageous clarity of the display unit during operation of the locating device can be achieved if the display element is designed to display the orientation of the item image separately from a display element for displaying the item image. In this context, "separately" should be understood as meaning, in particular, display elements arranged such that they are separate from one another. In an alternative refinement of the disclosure, the display element for displaying the orientation of the item image and the display element for displaying the item image may be formed in one piece and/or in one part with one another.

The disclosure also proposes that the display element is formed by a light emitting diode, thus making it possible to achieve a particularly cost-effective and, in particular, long-lasting display unit.

The disclosure also proposes that the display unit has at least one display matrix, thus making it possible to display the image and/or the item image in a particularly flexible and dynamic manner. In this case, a "display matrix" should be understood as meaning, in particular, an arrangement of a plurality of display elements with respect to one another, the display being able to be effected in this case in columns and/or rows, in particular. The display matrix is preferably formed by a liquid crystal display (LCD). In principle, other display matrices which appear to be useful to a person skilled in the art are always conceivable in an alternative refinement of the disclosure.

The display unit particularly advantageously comprises a segment display, thus making it possible for the operator to advantageously read and/or acquire an item of information displayed using the segment display and/or the displayed image. In this case, a "segment display" should be understood as meaning, in particular, a display unit having a plurality of individual segment elements, in which case letters, numbers or characters can be displayed by electronically and/or electromechanically driving the individual segment elements or a plurality of segment elements.

Another refinement of the disclosure proposes a locating method using a locating device for detecting the presence of an item arranged in an examination object using a measurement signal, an orientation of an item image with respect to a reference variable being determined using a computation unit of the locating device. A detailed item of information relating to the location of the item in the examination object, such as in particular a profile of the item in the examination object, can be advantageously acquired and, in particular, transmitted to the operator, and a high degree of ease of use during operation of the locating device can be achieved in association therewith.

The orientation of the item image with respect to the reference variable is particularly advantageously displayed using a display unit of the locating device. In this case, a detailed map of a structure, in particular of an internal structure, of the examination object can be advantageously displayed for the operator. In this case, the orientation of the item image can be graphically displayed for the operator in a particularly advantageous manner and the operator can thus optically detect the orientation in a particularly rapid manner.

BRIEF DESCRIPTION OF THE DRAWINGS

Further advantages emerge from the following description of the drawings. The drawings illustrate exemplary embodiments of the disclosure. The drawings, the description and the claims contain numerous features in combination. A person skilled in the art will expediently also consider the features individually and will combine them to form useful further combinations.

In the drawings:

FIGS. 4a-4g show a schematic detailed view of alternative refinements of the display unit having the liquid crystal display.

DETAILED DESCRIPTION

Figure 1:
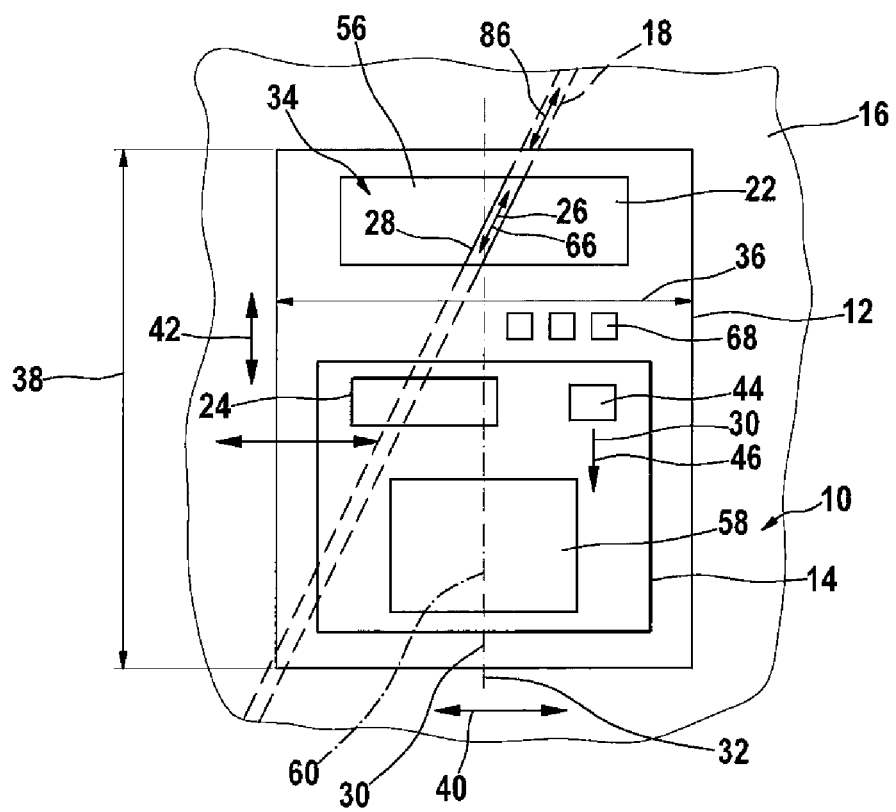
FIG. 1 shows a schematic view of a locating device having a locating unit.
Figure 2:
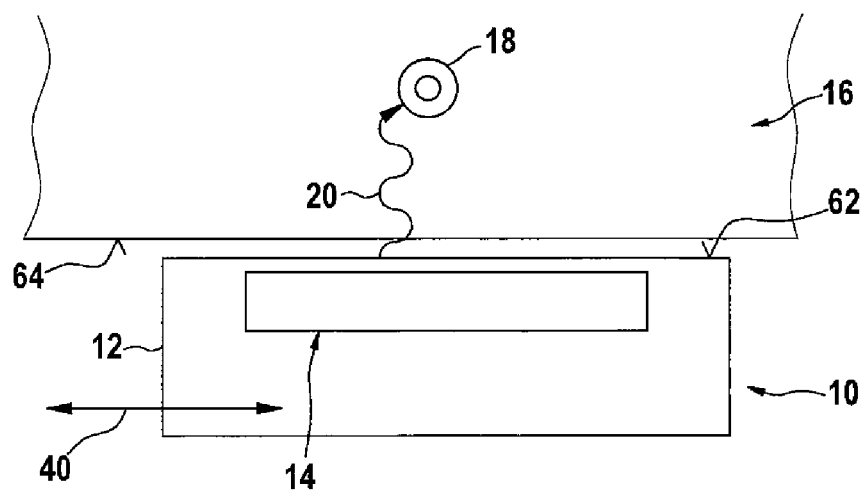
FIG. 2 shows a plan view of the locating device together with an examination object.

FIGS. 1 and 2 schematically illustrate a handheld locating device 10. The locating device 10 has a locating unit 14 which is intended to detect the presence of an item 18 arranged in an examination object 16, for example a wall, using a measurement signal 20 (FIGS. 1 and 2). The locating device 10 also has a housing 12 which surrounds the locating unit 14. The locating unit 14 has a sensor unit 58 which is intended to emit and/or detect the measurement signal 20, the sensor unit 58 being able to be formed by all sensor units 58 which appear to be useful to a person skilled in the art. The locating device 10 also comprises a computation unit 24 which is intended to evaluate the measurement signals 20 and/or data acquired by the sensor unit 58.

Both a position of items 18 in the examination object 16 and an orientation 86 of the items 18 are detected during operation of the locating device 10 by means of the computation unit 24 and the sensor unit 58 using the sensed measurement signals 20 and/or data. In this case, the orientation 86 of the items 18 is substantially parallel to a longitudinal extent along a length of the items 18. The computation unit 24 first of all determines an item image 28 using the data sensed by the sensor unit 58 and the computation unit 24 determines an orientation 26 of the item image 28. In this case, the computation unit 24 determines the orientation 26 of the item image 28 with respect to a reference variable 30. The reference variable 30 is formed by a housing characteristic variable 32, the housing characteristic variable 32 being formed by a longitudinal axis 60 of the locating device 10, with the result that the orientation 26 of the item image 28 is always determined with respect to a position of the locating device 10 on the examination object 16 during operation.

The computation unit 24 also determines an image 34 of the examination object 16 and/or of the item 18 with assignment of the image 34 to dimensions 36, 38 of the housing 12 along two directions 40, 42. The two directions 40, 42 also span a plane which is parallel to a housing surface 62 and is oriented parallel to a surface 64 of the examination object 16 in a correct operating position of the locating device 10. The image 34 thus reproduces a region of the examination object which is concealed by the housing 12, with the result that the operator can assign the items 18 which have been located in the examination object 16 in a particularly simple manner. For this purpose, the computation unit 24 uses a sensor element (not illustrated in any more detail) to detect a reference characteristic variable of the housing 12 with respect to the examination object 16, which reference characteristic variable is used to restrict the image determined by the computation unit 24 to the dimensions 36, 38 of the housing 12. In principle, the image 34 determined by the computation unit 24 can also be limited to a measurement range of the sensor unit 58 and/or further ranges which appear to be useful to a person skilled in the art.

The locating unit 14 also comprises an inclination sensor 44 which is intended to detect an orientation of the reference variable 30 formed by gravitational acceleration 46. The computation unit 24 determines the orientation 26 of the item image 28, which is formed by an absolute orientation 66, using the gravitational acceleration 46 acting on the locating device 10.

Figure 3A:
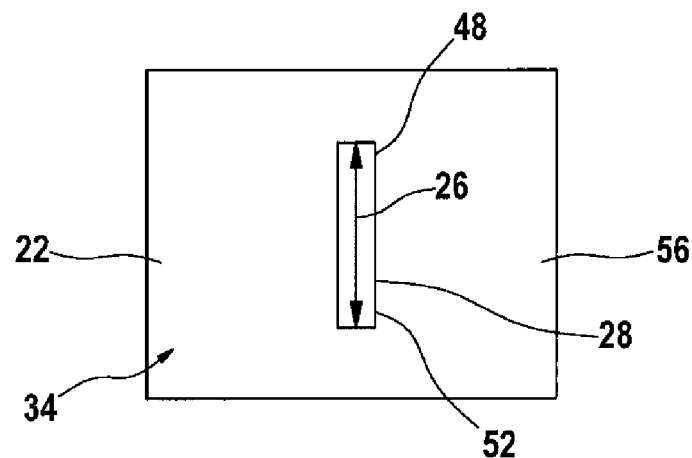
FIGS. 3a-3c show a schematic illustration of a display unit of the locating device having a liquid crystal display.
Figure 3B:
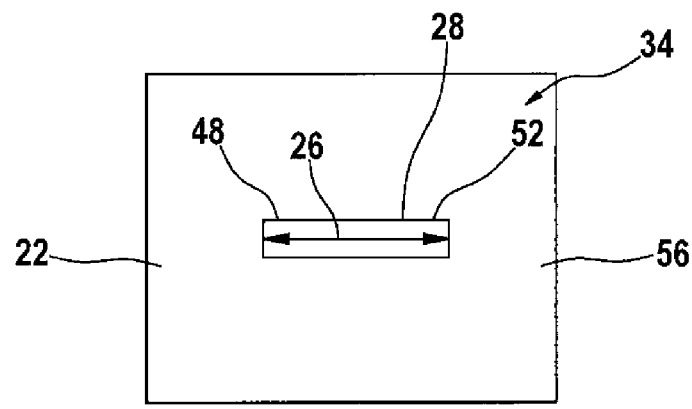
Figure 3C:
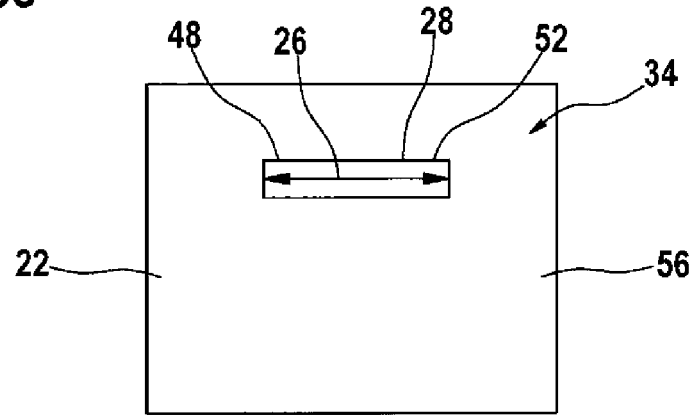

The locating device 10 also comprises a display unit 22 which is intended to display items 18 detected during measurement operation using item images 28 determined by the computation unit 24. The display unit 22 has a display matrix 56 formed by a liquid crystal display, as illustrated in more detail in FIG. 3a. FIGS. 3b and 3c show the display unit 22 with further item images 28. The display matrix 56 has a plurality of display elements 48, 52 which are intended both to display the orientation 26 of the item image 28 and to display the item image 28. In this case, the display elements 48, 52 for displaying the orientation 26 of the item image 28 and the display elements 48, 52 for displaying the item image 28 are formed in one piece. The individual display elements 48, 52 are respectively formed by individual segments and/or pixels (FIGS. 3a to 3c). In addition, the display unit 22 is used to display a location and/or position of the located item 18 for the operator using the image 34 determined by the computation unit 24 and the item image 28. In this case, a position of the item image 28 inside the image 34 of the examination object 16 corresponds substantially to a position of the item 18 in that region of the examination object 16 which is covered by the locating device 10 during measurement operation.

The display unit 22 is connected to the computation unit 24 via an internal data line (not illustrated in any more detail), the computation unit 24 controlling data output to the operator during operation of the locating device 10 using the display unit 22. During measurement operation of the locating device 10, the operator can choose whether the orientation 26 of a located item image 28 should be displayed with respect to the housing characteristic variable 32 or the gravitational acceleration 46. For this purpose, the locating device has an operating element 68 formed by a selection key which can be used by the operator to input a display mode for the display unit 22.

FIGS. 4a to 6 illustrate alternative refinements and/or display variants of the display unit 22. Components, features and functions which remain substantially the same are, in principle, denoted using the same reference symbols. In order to distinguish the exemplary embodiments, the letters a to g are added to the reference symbols in the following exemplary embodiments. The following description is substantially restricted to the differences from the exemplary embodiment in FIGS. 1 to 3c, in which case reference can be made to the description of the exemplary embodiment in FIGS. 1 to 3c with respect to components, features and functions which remain the same.

FIGS. 4a to 4c illustrate alternative display units 22a having a display matrix 56a of a locating unit 14 known from FIGS. 1 and 2, which display matrix is formed from a liquid crystal display. The display unit 22a has two separate display regions 70a, 72a with display elements 48a, 50a, 52a which are each intended to display an orientation 26a of an item image 28a. In addition to displaying the orientation 26a, as described in FIGS. 3a to 3c, character output is additionally provided in this case in order to output characters 74a for the purpose of indicating and/or displaying the orientation 26a of the item image 28a. In this case, the display elements 50a for written output may output an inclination angle of the item image 28a with respect to a reference variable 30 formed by an axis of a housing 12a or gravitational acceleration 46a and/or may output words relating to the orientation 26a of the item image 28a, for example "horizontal", "transverse", and/or may display other indications of direction which appear to be useful to a person skilled in the art.

FIG. 4d illustrates an alternative display unit 22b having a display matrix 56b of a locating unit 14 known from FIGS. 1 and 2, which display matrix is formed from a liquid crystal display. The display unit 22b has a display element 52b for displaying an item image 28b and a display element 48b, which is arranged separately therefrom, for displaying an orientation 26b of the item image 28b with respect to a reference variable 30 formed by an axis of a housing 12 of the locating device 10 and/or gravitational acceleration 46. The display element 48b for displaying the orientation 26b of the item image 28b is formed by a symbol output means 76b, with the result that the orientation 26b is always displayed for an operator in the form of a symbol during operation. In principle, it is conceivable to display the orientation 26b in a similar manner to FIGS. 4a to 4c in a further refinement of the disclosure.

FIG. 4e illustrates an alternative display unit 22c having a display matrix 56c of a locating unit 14 known from FIGS. 1 and 2, which matrix is formed from a liquid crystal display. The display unit 22c has a display element 52c for displaying an item image 28c of a detected item 18, the item image 28c being indicated to the operator in the display unit 22c by outputting a symbol 76c, for example "!". The display unit 22c also has a display element 48c which is intended to display an orientation 26c of the item image 28c with respect to a reference variable 30 formed by a housing axis and/or gravitational acceleration 46. The display element 48c for displaying the orientation 26c is formed in a substantially similar manner to the exemplary embodiment in FIG. 4d. The display unit 22c also has a further display element 78c which is intended to output characters 74c for the operator. This display element 78c can be used to output further information relating to the located item 18 to the operator, for example an indication of depth and/or an indication of position with respect to an axis and/or a reference line, for example an edge of the housing 12 etc.

FIGS. 4f and 4g illustrate alternative display units 22d having a display matrix 56d of a locating unit 14 known from FIGS. 1 and 2, which matrix is formed from a liquid crystal display. In this case, the display of item images 28d of located items 18 with an orientation 26d, formed by a preferred direction, with respect to a reference variable 30 formed by gravitational acceleration 46 or an axis of a housing 12 can be carried out in a similar manner to one of the exemplary embodiments in FIGS. 3a to 4e. Item images 28d of located items 18 whose orientation 26d does not have a preferred direction and which are, in particular, oriented in a symmetrical manner and particularly advantageously in a rotationally symmetrical manner, for example a screw, are represented, during operation, by a circle and/or by other symmetrical symbols, for example a star-shaped arrangement of arrows, and/or other symmetrical symbols which appear to be useful to a person skilled in the art. The symmetrical symbols are displayed for the operator by means of a symbol output means 76d of a display element 48d of the display unit 22d.

It is also conceivable for the display unit 22, 22a, 22b, 22c, 22d to have a plurality of the display variants illustrated in FIGS. 3a to 4g and for the operator of the locating device 10 to be able to select a form of representation during a locating measurement.

Figure 5A:
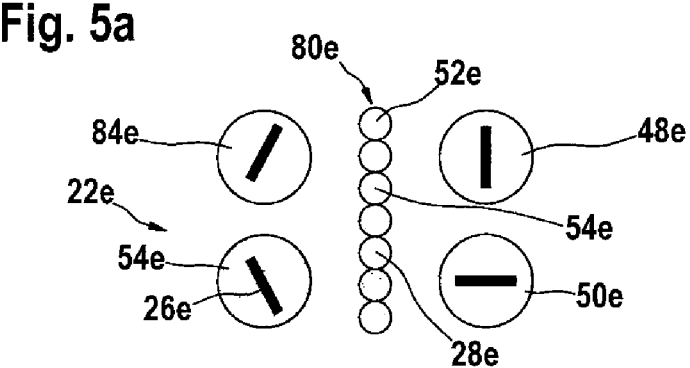
FIGS. 5a-5d show a schematic illustration of alternative refinements of the display unit with a light emitting diode display.
Figure 5B:
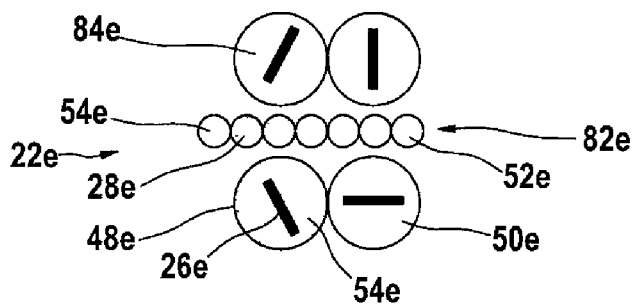

FIGS. 5a and 5b illustrate alternative display units 22e of a locating unit 14 known from FIGS. 1 and 2. The display unit 22e has a plurality of display elements 52e which are each formed by a light emitting diode 54e and are arranged along a column 80e (FIG. 5a) or a row 82e (FIG. 5b). During operation, the display elements 52e are used to indicate, to the operator of the locating device 10, whether an item 18 has been located by displaying an item image 28e. In addition, the operator can be informed of positioning of the item 18 by outputting the item image 28e by virtue of a computation unit 24 of the locating unit 14 selecting the appropriate display elements 52e for displaying the item image 28e. The display unit 22e also has further display elements 48e, 50e which are intended to display an orientation 26e of the item image 28e, which is determined by the computation unit 24e, with respect to a reference variable 30. The display elements 48e, 50e each have a light emitting diode 54e and a symbol mask 84e which is arranged in front of the light emitting diode 54e along a direction of sight of the operator, is illuminated by said light emitting diode and indicates the orientation 26e of the item image 28e with respect to a housing axis or gravitational acceleration 46 to the operator. The different display elements 48e, 50e are controlled by the computation unit 24e, such that a corresponding display element 48e, 50e respectively lights up together with the first display elements 52e.

Figure 5C:
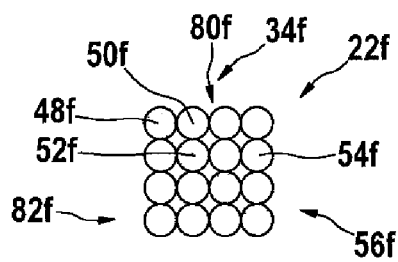
Figure 5D:
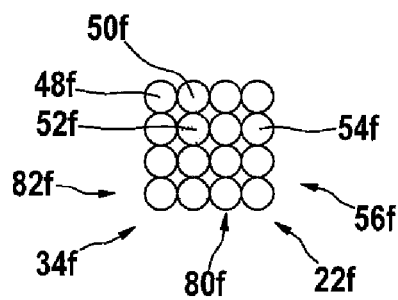

FIGS. 5c and 5d illustrate alternative display units 22f of a locating unit 14 known from FIGS. 1 and 2. The display unit 22f has a plurality of display elements 48f, 50f, 52f which are each formed by a light emitting diode 54f and are arranged in a display matrix 56f, the light emitting diodes 54f being arranged in columns 80f and rows 82f with respect to one another. The individual light emitting diodes 54f are driven via a computation unit 24 of the locating unit 14, with the result that, in addition to an item of information relating to a located item 18, a location and/or position with respect to the locating device 10, in particular a housing 12 of the locating device 10, and an orientation 26f of an item image 28f of the item 18, as determined by the computation unit 24, with respect to a housing axis or gravitational acceleration 46 can also be transmitted to the operator.

Figure 6:
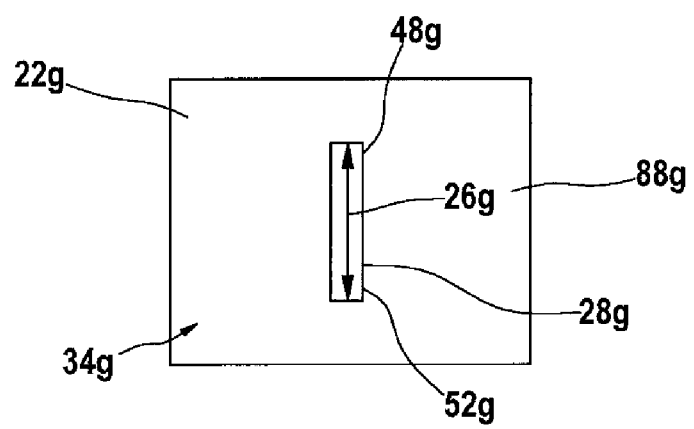
FIG. 6 shows a schematic detailed view of an alternative refinement of the display unit in the form of a segment display.

FIG. 6 illustrates an alternative display unit 22g having a segment display 88g of a locating unit 14 known from FIGS. 1 and 2. The segment display 88g has a plurality of display elements 48g, 52g which are intended both to display the orientation 26g of the item image 28g and to display the item image 28g, the display elements 48g, 52g each being formed by one or more segment display elements of the segment display 88g. In this case, a method of operation of the segment display 88g for displaying the orientation 26g of the item image 28g is similar to the description of FIGS. 1 to 3c. Alternative refinements and/or display variants of the segment display 88g are similar to the description of FIGS. 4a to 4g.

The invention claimed is:

1. A locating device comprising:
a portable, handheld housing having dimensions that define a reference variable, the housing having a two-dimensional housing surface;
a display unit; and
a locating unit configured to detect presence of objects in a region of an examination object located in front of the housing surface using a measurement signal and includes a computation unit configured to generate an item image for the item from the measurement signal of the region currently located in front of the housing surface, the item image having at least two dimensions and depicting at least a profile of the item,
wherein the display unit is configured to display the item image including the profile of the item, and
wherein the computation unit is configured to determine an orientation of the item detected in the examination object with respect to the reference variable of the housing using the item image generated by the computation unit.

2. The locating device as claimed in claim 1, wherein the computation unit is configured to map the item image onto a two-dimensional space defined with reference to the dimensions of the housing surface.

3. The locating device as claimed in claim 2, wherein the computation unit is configured to detect the orientation of the item in the examination object with respect to the dimensions of the housing surface.

4. The locating device as claimed in claim 3, wherein the locating unit has at least one inclination sensor which is configured to detect an orientation of the reference variable with respect to gravity by detecting gravitational acceleration.

5. The locating device as claimed in claim 1, wherein the display unit has at least one display element which is intended to display the orientation of the item image with respect to the reference variable.

6. The locating device as claimed in claim 5, wherein the display element includes a first display element for displaying the orientation of the item image separately from the item image, and a second display element for displaying the item image.

7. The locating device as claimed in claim 5, wherein the display element is formed by a light emitting diode.

8. The locating device as claimed in claim 5, wherein the display unit has at least one display matrix.

9. The locating device as claimed in claim 5, wherein the display unit comprises a segment display.

10. A locating method using a locating device comprising:
using a portable, handheld locating unit to detect the presence of an item arranged in an examination object using a measurement signal;
generating an image of the region of the examination object located in front of a housing of the handheld locating unit from the measurement signal and a reference variable using a computation unit of the locating device, the image having at least two dimensions and depicting at least a profile of the item, the reference variable being defined by a housing of the locating device;

determining an orientation of the item with respect to the housing from the image of the item using the computation unit of the locating device; and displaying the image using a display unit of the locating device.

11. The locating method of claim 10, further comprising:

emitting the measurement signal from a sensor unit into the examination object.

\* \* \* \* \*

UNITED STATES PATENT AND TRADEMARK OFFICE
CERTIFICATE OF CORRECTION

PATENT NO. : 9,715,011 B2
APPLICATION NO. : 13/133849
DATED : July 25, 2017
INVENTOR(S) : Reiner Krapf et al.

It is certified that error appears in the above-identified patent and that said Letters Patent is hereby corrected as shown below:

On the Title Page

Item (75) should read:
Inventors: Reiner Krapf, Filderstadt (DE);
 Christoph Wieland, Stuttgart-Vaihingen (DE); Ulli Hoffmann, Niefern-Oeschelbronn (DE)

Signed and Sealed this
Seventh Day of November, 2017

Joseph Matal
*Performing the Functions and Duties of the*
*Under Secretary of Commerce for Intellectual Property and*
*Director of the United States Patent and Trademark Office*